Dec. 8, 1953 T. CASTIGLIA 2,661,653
OPTICAL PROJECTION LEVELING DEVICE
Filed April 27, 1951
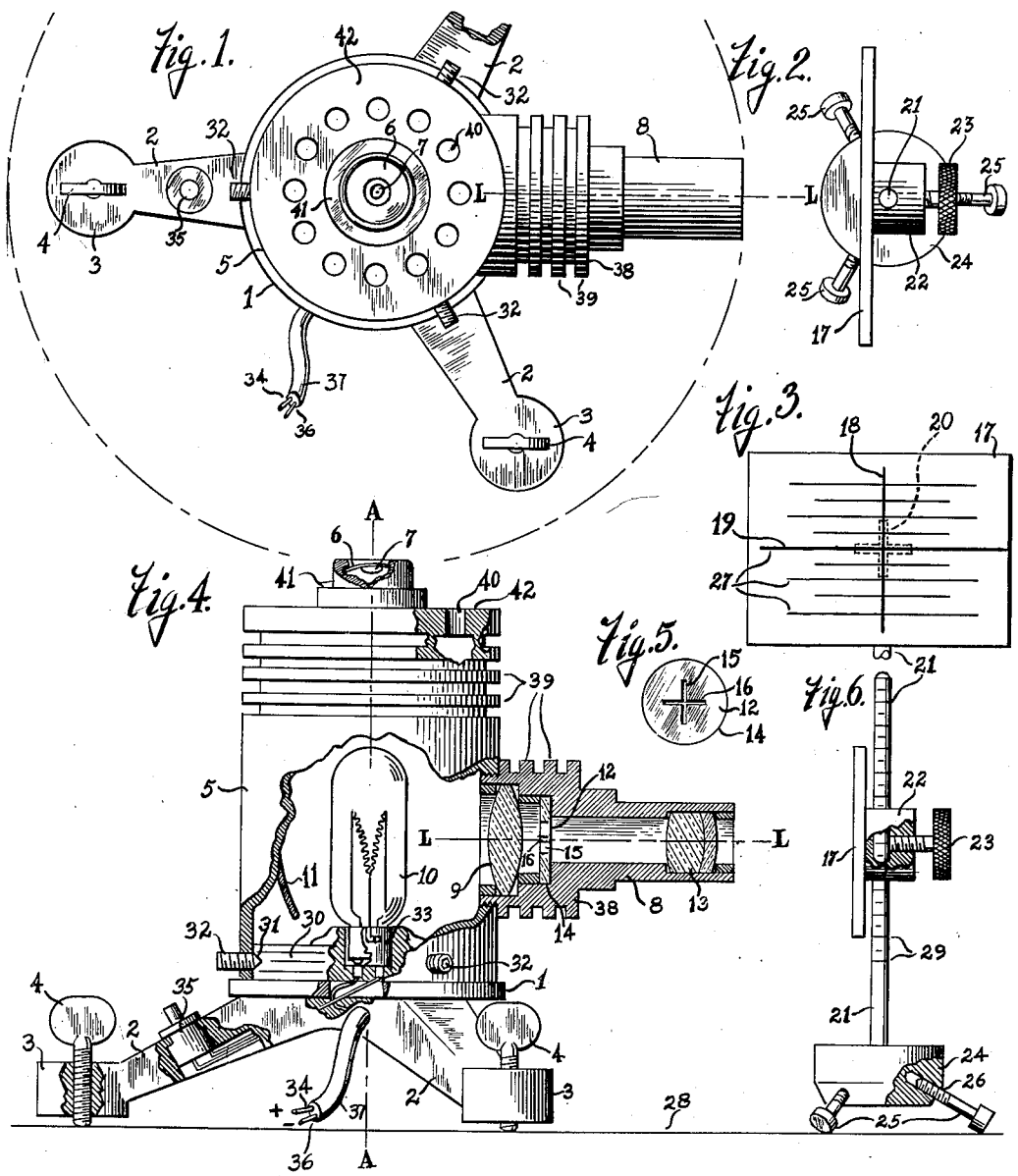
INVENTOR.
Thomas Castiglia
BY Paul A. Talbot.
ATTORNEY Patented Dec. 8, 1953

2,661,653

UNITED STATES PATENT OFFICE 2,661,653

OPTICAL PROJECTION LEVELING DEVICE

Thomas Castiglia, New York, N. Y., assignor to Wheel Aligning Necessities, Inc., New York, N. Y., a corporation of New York Application April 27, 1951, Serial No. 223,244

4 Claims. (Cl. 88—24)

My invention relates to leveling devices and particularly to a projector and target for leveling a limited floor area, such as the area on which each of the wheels of vehicles may rest, to increase the accuracy of instruments for determining the characteristics of wheels.

Among the purposes and objects are to provide a compact projector and target by which light rays, defining lines, are projected on the cooperating lines of the target.

Another object is to project hair lines to instantly show the relative elevations of limited areas.

Another object is to determine and correct the levels and relative elevations of the areas on which the wheels of automobiles or other vehicles rest.

Still another object is to provide a convenient device for leveling interior floors, such as the floor of a room and to determine the amount each or any area of the floor is out of level in relation to other areas.

An object is to construct a line projector having a fine slit or cross slits at the focal point of the projector lens system, whereby rays of light from a lamp pass through a condenser lens, the slits on an opaque field and through the projector lens to a distant screen or target.

An object is to provide a rotatable light housing and lens system secured to and rotatable with the light housing and a bubble glass to determine the true perpendicular axis of the housing and the true horizontal of the lens system axis and its projected level line throughout the sweep of the fine line of projected light rays as the lens system is rotated and projected on any target.

Another object is to provide a tripod comprising an adjusting means and a lens system rotatably supported to project rays of light in a thin horizontal line on targets disposed about the tripod thus to project a true horizontal plane, when adjusted.

I accomplish these and other objects by the construction herein described and shown in the accompanying drawing forming a part of this my disclosure.

In the drawing:

Fig. 1 is a plan view of my projector.

Fig. 2 is a plan view of the target.

Fig. 3 is a front elevational view of the target with the base removed.

Fig. 4 is a front elevation of the projector with parts broken away to show the interior.

Fig. 5 is an elevational view of the slitted disc or object.

Fig. 6 is a side elevation of the target.

Fig. 7 is a wiring diagram of the lighting circuit.

Similar reference characters refer to similar parts throughout the several views of the drawing and in the specifications bearing reference thereto.

I am aware that levels rotatably mounted on a tripod for surveying and determining levels is not new; these are well known and their construction and use need not be here discussed, they are too expensive and clumsy to be useful leveling a part of the floor in a confined space such as the parts of the floor of a room. The area covered by the wheels of an automobile or similar vehicle while being tested makes it desirable to have a compact convenient device that will quickly designate the accurate elevation over a small area and show, when corrected, that such area is level, a device a mechanic can operate to get accurate results.

Surveyor's instruments view the target by sighting it, as through a telescope. My device projects fine lines of light rays as by a magic lantern.

The target, like a screen in a movie theater, receives the lines projected onto it. The lines are fine and the target has lines also, which when brought into register show that the floor, on which the target rests is level. The lines may be a scale which shows the precise amount the floor is out of true level such as the fraction of an inch the floor is high or low at that particular point or area on which the target is set. The target may be moved from place to place or a plurality of targets may be stationed at the various areas where the floor is to be leveled or adjusted to cause it to be level, such for instance, as by adding layers of sheet material.

My device is only a few inches high so, unlike a surveyor's level, it does not have to be high enough to see through; the user merely swings the projector to one target after the other, anywhere within the sweep of the circle about the instrument.

Where electric current is available the light rays are from an electric light bulb and when the projector is plugged in by means of a plug in cord and leveled up is ready for use.

I have not attempted to show all possible modifications of my leveling device, but rather have confined my disclosure to a preferred construction which is described in detail so that anyone skilled in the art to which my invention pertains may more readily understand how to make and practice the invention; modifications may suggest themselves after a study of this disclosure.

The preciseness of the detailed disclosure and the preciseness of the drawing are not intended to limit the scope of my invention which is set forth in the appended claims.

In the drawing I have shown a tripod base 1 having the outward extended arms 2, each of which is preferably provided, near its outward end 3 with the thumb adjusting screw 4 thus to provide easy adjustment to level the base and the housing 5, rotatably mounted on the base, to swing or sweep the circle (three hundred sixty degrees).

The housing, at the top center, is provided with the bubble glass 6 to instantly show the results of the movement of any or all of the screws 4 and when the bubble 7 is centered in the bubble glass, the vehicle axis A—A is precisely perpendicular to the earth's surface, or plumb as any radii to or through the earth's center.

The axis L—L, through the lens system 8, is precisely ninety degrees from the axis A—A, thus the axis L—L is level or on a plane, as it is swept by rotating the housing and lens system, with a true or level floor and any plurality of targets or receiving screens spaced about the projector will receive rays of light precisely level with the axis L—L; the light rays being a fine horizontal line.

The lens system comprises the condenser lens 9, which receives rays of light from the light bulb 10 and reflector 11 to transmit the rays to and through the object 12 disposed at the focal plane as related to the projector lens 13. The object is shown as a disc 14 having fine cross slits 15 and 16 through which the rays pass to be projected onto each or any target 17. The target is preferably provided with a vertical line 18 and a plurality of horizontal lines, one of which, 19 crosses the vertical center line of the target, are set level with the cross slits; the horizontal slit 16 and the horizontal line 19 thus determine the level or elevation of the target, the slit 15 and vertical line 18 the center.

The light image 20 projected onto the target is shown, in Fig. 3, in dotted lines. The target is preferably slidably mounted to travel vertically on the stanchion 21 by means of the tapped boss 22 secured to the back of the target and held at any desired elevation by the thumb set screw 23. The stanchion is provided with the base 24 having, as its support, the adjusting screws 25 which preferably engage the tapped holes 26, which are set at an angle, so that each or any of the screws, when moved into or outward in its respective tapped hole will tilt the base, stanchion and target, and when properly adjusted, will position the stanchion and target in a true vertical position.

The horizontal lines of the target in particular, are preferably disposed to provide a scale 27 by which the elevation, in relation to the floor 28, on which the target stands, may be determined, as for instance, eight inches or eight and five-eighths. If the amount or difference in elevation is greater the vertical height of the scale on the target, the scale or indicia 29 on the stanchion is then used to reset the target and its scale at a higher point on the stanchion. The target is moved either up or down as desired by loosening the screw 23 as hereinbefore described.

Several targets may be placed on the several positions on the floor or a single target together with its stanchion and support may be moved from one position to another on the floor.

The base 1 is preferably provided with an annular groove 30, preferably V shaped to receive the conforming tapered ends 31 of the set screws 32 which, when adjusted cause the housing to snugly yet rotatably secure the housing to the base.

The screws 32, when removed, permit the free withdrawal of the housing from the base to permit the renewal of the light bulb, cleaning of the interior, reflector, condenser lens or for repairs and assembling the parts.

The base 1 is preferably provided with a two prong bayonet socket 33 connected by the wire 34 to the switch 35 disposed on and secured to one of the arms and to the common wire 36. The wires 34 and 36 are connected by the plug-in cord 37, in the usual manner, to the source of electric current, not shown.

The lens tube 38 and the top of the housing are provided with air cooling fins 39 and the top of the housing is provided with ventilating holes 40 as well as the bubble glass housing 41 which mounts and secures the bubble glass onto the top wall 42 of the housing to level the device as hereinbefore described.

When the housing and other parts of the projector are leveled by the screws 4, as described, the target is adjusted to a plane on the same level as the axis of the lens system and when placed at another position on the floor, the difference in elevation is noted on the scale and indicia and the floor is raised or lowered so that any and all positions desired on the floor are at a common plane or level.

The size and materials of the various parts of my leveling device may vary to suit its uses in projecting fine light rays on receiving screens and targets or their scales and indicia.

Having thus described a preferred embodiment of my invention, what I claim as new and desire to secure by Letters Patent is set forth in the following claims.

I claim:

1. An optical projection leveling device comprising a housing rotatable on its vertical axis, a hollow base on which said housing is rotatably mounted, hollow legs and adjusting means supporting said base, electric switch means and connecting wires carried by said legs, an electric light in said housing connected to said wires, controlled by said switch means, and a lens system in an aperture in the side wall of said housing and rotating therewith through which rays from said light are projected, said lens system having its axis at precisely ninety degrees from said vertical axis, a disc and fine slit coaxial with the axis of said lens system, said system projecting a fine line on a target within the horizontal sweep of rotation of said lens system and on a plane precisely level with the axis of said lens system.

2. A leveling device as set forth in claim 1, wherein said housing has a level secured thereto for coacting with said adjusting means whereby the axis of said lens system may be set true and horizontal.

3. A leveling device as set forth in claim 1, wherein means is provided for detachably securing said housing to said base, said means having taper screws to regulate the fit between the base and housing.

4. A leveling device as set forth in claim 1, wherein the housing is provided with ventilating apertures and means for cooling said housing including annular fins disposed around the top thereof.

THOMAS CASTIGLIA.

References Cited in the file of this patent

UNITED STATES PATENTS

| Number | Name | Date |
|---|---|---|
| 341,690 | Reichenbach | May 11, 1886 |
| 486,236 | Pierling | Nov. 15, 1892 |
| 786,093 | Bostrom | Mar. 28, 1905 |
| 892,217 | Brown | June 30, 1908 |
| 1,115,026 | Saegmuller | Oct. 27, 1914 |
| 1,278,575 | Berg | Sept. 10, 1918 |
| 1,434,209 | Hort | Oct. 31, 1922 |
| 1,476,077 | Hort | Dec. 4, 1923 |
| 1,804,764 | Grant | May 12, 1931 |
| 2,065,699 | Herold | Dec. 29, 1936 |
| 2,292,968 | Peters | Aug. 11, 1942 |
| 2,400,840 | Peters | May 21, 1946 |
| 2,535,326 | Smith | Dec. 26, 1950 |
| 2,546,524 | Schipplock | Mar. 27, 1951 |
| 2,553,571 | Frans et al. | May 22, 1951 |